3,087,972
NITRO COMPOUNDS
William D. Emmons, Huntingdon Valley, and Robert W. White, Philadelphia, Pa., assignors to Rohm & Haas Company, Philadelphia, Pa., a corporation of Delaware
No Drawing. Filed Oct. 6, 1960, Ser. No. 60,814
11 Claims. (Cl. 260—645)

This invention concerns a method for making nitro compounds from amines. More specifically, the invention deals with a method for making nitro compounds from aromatic amines by oxidation with permaleic acid.

In the past, the conversion of aromatic amines to the corresponding nitro compounds has been carried out with peracetic acid or with peroxytrifluoroacetic acid. However, both of these methods have a number of serious shortcomings. Peracetic acid is ineffectual in oxidizing aromatic amines to the corresponding nitro compounds when the aromatic ring carries electron withdrawing substituents. Also, attempts to oxidize β-naphthylamine with peracetic acid failed, an intractable tar being obtained. Likewise, no useful products can be isolated when peroxytrifluoroacetic acid is substituted for peracetic acid in that reaction. Moreover, peroxytrifluoroacetic acid is so powerful that it often attacks the aromatic nucleus itself to yield a complex mixture containing phenols. Accordingly, it is apparent that an efficient and general oxidation method of aromatic amines to the corresponding nitro compounds was very much to be desired.

The present invention provides an efficient method of wide applicability for oxidizing aromatic amines to the corresponding nitro compounds. Unexpectedly, the method of the invention readily converts aromatic amines having no other substituent on the ring than the amino group, as well as aromatic amines having electron withdrawing substituent on the aromatic ring. Moreover, unexpectedly, it provides for the oxidation of an amino grouping on a naphthalene ring, an area where prior conventional methods had failed. In the present method, the products are obtained efficiently in good yields and without the undesirable occurrence of by-product.

The method of the invention comprises reacting an aromatic amine with permaleic acid to yield the corresponding nitro compound. The aromatic amine may be represented by the general formula

(I)

wherein A is aryl group and S an inert substituent.

Generally, A is an aryl group containing a maximum of 10 carbon atoms in the ring, such as phenyl or naphthyl. But, A may also represent a higher molecular weight aryl group, such as anthracyl and the like. S represents electron withdrawing or electron releasing substituent, such as a formyl, nitro, cyano, acetyl, ethoxycarbonyl, a halogen of an atomic number of 17 to 53, including iodine, bromine, and chlorine, hydroxycarbonyl, and hydroxyl, methoxycarbonyl, methoxy, and methyl. A may have no other substituent than the amino group, or it may have one or more S substituents; these in turn, may be alike or different. The subscript $n$ is equal to 1 or to a number more than 1 in the instances where there are a plurality of amino groups bonded onto the aromatic ring.

Typical of the aromatic amines employed in the invention are the following: aniline, 1,2-nitroaniline, 1,4-nitroaniline, 1,3-nitroaniline, 1,4-chloroaniline, 1,2-chloroaniline, 1,3-chloroaniline, 1,3-bromoaniline, 1,2-bromoaniline, 1,4-bromoaniline, 1,4-iodoaniline, 1,2-aminobenzoic acid, 1,4-aminobenzaldehyde, 1,2-aminobenzaldehyde, 2,4 - dinitroaniline, 2,4,6 - trinitroaniline, 2,4,6-tribromoaniline, ethyl p-aminobenzoate, 2,6-dibromo-4-nitroaniline 1-amino-3-nitrobenzene, 1-naphthylamine, 2-naphthylamine, 2-amino-7-nitronaphthalene, 1,4-naphthalenediamine, 1,5-naphthalenediamine, 2,3-naphthalenediamine, 2,6-naphthalenediamine, 1,4-methoxyaniline, 1,3-toluidine, 2-methyl-5-nitroaniline, and the like.

The amount of permaleic acid required by theory is 3 moles of permaleic acid per amino group in the aromatic amine. A very satisfactory procedure is to use an excess of permaleic acid, as, for instance, 10 to 100 mole percent, or more.

The temperature at which the reaction is carried out is not critical since the oxidation of the amine to the nitrile proceeds over a wide range of temperature. However, since at the higher temperature range the self-decomposition of permaleic acid tends to take precedence over the reaction of the permaleic acid with the amine, it is preferred to maintain the temperature below about 140° C., more especially below 80° C.; for best results the temperature range is about 0° C. to about 40° C., refluxing temperature being especially desirable. Below 0° C. the rate of reaction is unnecessarily slow.

The reaction may be carried out at sub- or super-atmospheric pressure, but atmospheric conditions are preferred.

Preferably, the oxidation is carried out in the presence of an inert solvent. Typical solvents include aliphatic and aromatic hydrocarbons, such as xylene, benzene, toluene, heptane, octane, and the like; polychlorinated and monochlorinated hydrocarbons, like chlorobenzene, tetrachloroethane, chloroform, carbon tetrachloride, methylene dichloride, ethylene dichloride, and the like. Presently, solvents in which maleic acid is insoluble are preferred since they provide a very efficient manner for separating the maleic acid which precipitates out as it is formed during the course of the reaction.

The progress of the reaction may be followed by iodiometric titration of aliquots of the reaction mixture. When no further consumption of permaleic acid is observed, the reaction is substantially complete. Maleic acid is removed from the reaction mixture by any convenient method, as for example, by filtration. Excess peracid, if any, may be separated by any suitable method, as, for example, by washing with aqueous alkali. Solvent is then removed by suitable procedures, for example, by stripping under reduced pressure. The nitro product is generally obtained in good yield.

As an alternate procedure, the permaleic acid may be prepared in situ from maleic acid or its anhydride. Preferably, there is present a molar excess of hydrogen peroxide with respect to the maleic acid or maleic anhydride. As the formation of the permaleic acid proceeds, the permaleic acid reacts with the aromatic amine to form the corresponding aromatic nitrile.

Typical products which are formed from the aromatic amines, in accordance with this invention, include: nitrobenzene, 1,2-nitrobenzene, 1,4-nitrobenzene, 1,3-nitrobenzene, 1,2,4-trinitrobenzene, 1,3,5-trinitrobenzene, ethyl 1,4-nitrobenzoate, 1-nitronaphthalene, 1,6-dinitronaphthalene, 2,4-dinitronaphthalene, 1,4-dinitronaphthalene, 1,4-methoxynitrobenzene, 1,3-methylnitrobenzene, 2-methyl-5-dinitrobenzene, and the like.

The following examples are provided by way of illustration of the invention and not by way of limitation. As will be appreciated by one skilled in the art, the manipulative steps involved in the process follow essentially the same pattern. By substitution of the desired starting aromatic amine, the desired nitro compound is readily obtainable, optimum yield being readily obtained in each individual case by minor adjustments to the various conditions by one skilled in the art. All parts are by weight.

EXAMPLE 1

To a refluxing permaleic acid solution containing 12.3 parts (0.125 mole) of permaleic acid and 50 parts of methylene chloride there was added a solution of 2.76 parts (0.02 mole) of 1,4-nitroaniline in 50 parts of methylene chloride. The mixture is heated to a temperature of 40° C. for one hour. When the theoretical amount of permaleic acid disappears, as determined by idodimetric titration of aliquots, the solution is cooled and maleic acid removed by filtration. The resulting mixture was washed with 50 parts of 10% sodium carbonate, dried over magnesium sulfate, and the solvent is removed leaving 2.9 parts of 1,4-dinitrobenzene having a melting point of 171° to 173° C.

EXAMPLE 2a 6.6 parts of 2,4,6-tribromoaniline in solution in 12.3 parts of permaleic acid in 50 parts of methylene chloride are refluxed at 40° C. At the end of the reaction, there is isolated 6.5 parts of 2,4,6-tribromonitrobenzene having a melting point of 122° to 124° C.

EXAMPLE 2b

Likewise, by substitution of methylene chloride by ethylene chloride, the same product is obtained.

EXAMPLE 3a

A refluxing solution of 12.3 parts of permaleic acid in 50 parts of methylene chloride and 2.86 parts of 2-naphthylamine is brought to refluxing for one hour. When the reaction is completed, maleic acid is removed by filtration and 1.38 parts of 2-nitronaphthalene is isolated by filtration.

EXAMPLE 3b

In part (a) 1-naphthylamine is substituted by 2-amino-4-nitronaphthalene. The product is 2,4-dinitronaphthalene.

In the following Examples 4 to 9, the procedure of Example 1 is followed. To a solution of 25 parts of permaleic acid and 100 parts of methylene chloride refluxing at 80° C., there are added the following amine reactant, in the amount specified. The nitro compound product indicated in Table I is isolated.

Table I

| Examples | Amounts | Starting Amine | Nitro Product |
|---|---|---|---|
| 4 | 2.16 | 1,4-phenylenediamine | 1,4-dinitrobenzene. |
| 5 | 5.5 | 1,3-nitroaniline | 1,3-dinitrobenzene. |
| 6 | 6.6 | ethyl 1,4-aminobenzoate | ethyl 1,4-nitrobenzoate |
| 7 | 5.1 | 1,4-chloroaniline | 1,4-nitrochlorobenzene. |
| 8 | 6.9 | 1,4-bromoaniline | 1,4-nitrobromobenzene. |
| 9 | 7.5 | 1-amino-4-nitronaphthalene | 1,4-dinitronaphthalene. |

EXAMPLE 10

There are charged 10.2 parts (0.3 mole) of 90% hydrogen peroxide, 39.2 parts (0.4 mole) of maleic anhydride and 150 parts of methylene chloride and 9.3 parts of aniline to a reactor and the mixture is brought to refluxing. After completion of the reaction, there is isolated 10.2 parts of nitrobenzene.

We claim:

1. A process for making nitro compounds, which comprises reacting an aromatic amine of the formula

$$A\!-\!(NH_2)_n \qquad (I)$$

in which A is an aryl group of 6 to 10 carbon atoms, and
  n is an integer of 1 to 2 with at least 3 moles of permaleic acid per amino group in the aromatic amine, in the presence of an inert organic solvent at a temperature from 0° to 140° C. and below that at which the self-decomposition of permaleic acid predominates over the oxidation of the amine by the permaleic acid.

2. The process of claim 1 in which in Formula I $n$ is 2.
3. The process of claim 1 in which in Formula I A is naphthyl.
4. The process of claim 3 in which the aromatic amine is 2-naphthylamine.
5. The process of claim 1 in which in Formula I A is phenyl.
6. A process for making nitro compounds which comprises reacting an aromatic amine of the formula

$$A\diagup^{(NH_2)_n}_{\diagdown S} \qquad (II)$$

in which A is an aryl group of 6 to 10 carbon atoms,
  S is a substituent selected from the group consisting of formyl, nitro, cyano, acetyl, ethoxy carbonyl, a halogen atom of an atomic number of 17 to 53, hydroxy carbonyl, hydroxyl, methoxy carbonyl, methoxy and methyl, and
  n is an integer of 1 to 2, with at least 3 moles of permaleic acid per amino group in the aromatic amine, in the presence of an inert organic solvent at a temperature from 0° to 140° C. and below that at which the self-decomposition of permaleic acid predominates over the oxidation of the amine by the permaleic acid.

7. The process of claim 6 in which the aromatic amine is 1,4-nitroaniline.
8. The process of claim 6 in which the aromatic amine is 2,6-nitrobromoaniline.
9. The process of claim 6 in which the aromatic amine is ethyl 1,4-aminobenzoate.

10. A method for making nitro compounds which comprises reacting, in the presence of an inert organic solvent, hydrogen peroxide, an acidic member selected from the group consisting of maleic acid and maleic anhydride, and an aromatic amine of the formula

$$A\!-\!(NH_2)_n \qquad (I)$$

in which A is an aryl group of 6 to 10 carbon atoms, and
  n is an integer of 1 to 2, the amount of said acidic member being at least three moles per amino group in the starting aromatic amine, the amount of hydrogen peroxide being in excess of the amount of said acidic member and the temperature being in the range of about 0° to 140° C. and below that at which the self-decomposition of permaleic acid predominates over the oxidation of the aromatic amine.

11. A method for making nitro compounds which comprises reacting, in the presence of an inert organic solvent, hydrogen peroxide, an acidic member selected from the group consisting of maleic acid and maleic anhydride, and an aromatic amine of the formula

(II)

in which A is an aryl group of 6 to 10 carbon atoms,
S is a substituent selected from the group consisting of formyl, nitro, cyano, acetyl, ethoxy carbonyl, a halogen atom of an atomic number of 17 to 53, hydroxy carbonyl, hydroxyl, methoxy carbonyl, methoxy and methyl, and
$n$ is an integer of 1 to 2, the amount of said acidic member being at least three moles per amino group in the starting aromatic amine, the amount of hydrogen peroxide being in excess of the amount of said acidic member and the temperature being in the range of about 0° to 140° C. and below that at which the self-decomposition of permaleic acid predominates over the oxidation of the aromatic amine.

References Cited in the file of this patent

Emmons: Journal of American Chemical Society, vol. 79 pages 5528–5530 (1957).

Parker et al.: Journal of American Chemical Society, vol. 79 pages 1929–1931 (1957).